US006330146B1

(12) United States Patent
Blitshteyn et al.

(10) Patent No.: US 6,330,146 B1
(45) Date of Patent: Dec. 11, 2001

(54) PIEZOELECTRIC/ELECTROSTRICTIVE DEVICE AND METHOD OF MANUFACTURING SAME

(75) Inventors: Mark Blitshteyn, New Hartford, CT (US); Lisle R. Knight, Jr., Richmond, CA (US); Petr Gefter, South San Francisco, CA (US); Scott J. S. Gehlke, Berkeley, CA (US); Ira J. Pitel, Morristown, NJ (US); Sean J. Quigley, Upper Darby; Michael J. Leonard, Bala Cynwyd, both of PA (US); John K. O'Reilly, Cavan (IE)

(73) Assignee: Ion Systems, Inc., Berkeley, CA (US)

( * ) Notice: Subject to any disclaimer, the term of this patent is extended or adjusted under 35 U.S.C. 154(b) by 0 days.

(21) Appl. No.: 09/519,159

(22) Filed: Mar. 6, 2000

Related U.S. Application Data

(60) Provisional application No. 60/124,231, filed on Mar. 12, 1999.

(51) Int. Cl.[7] .............................. H01H 47/00; H01G 7/00
(52) U.S. Cl. .............................. 361/220; 29/25.41
(58) Field of Search .............................. 361/212, 214, 361/234, 220, 222; 29/25.41, 25.4, 825, 826

(56) References Cited

U.S. PATENT DOCUMENTS

| | | | |
|---|---|---|---|
| 3,551,743 | 12/1970 | Koepke | 317/2 |
| 3,585,448 | 6/1971 | Simons | 317/2 F |
| 3,652,897 | 3/1972 | Iosue et al. | 317/2 F |
| 3,875,461 | 4/1975 | Richardson et al. | 317/2 F |
| 3,921,037 | 11/1975 | Testone | 317/2 F |
| 3,968,405 | 7/1976 | Testone | 317/2 F |
| 4,031,599 | 6/1977 | Testone | 29/25.41 |
| 4,048,667 | 9/1977 | Brennecke | 361/213 |
| 4,216,518 | 8/1980 | Simons | 361/213 |
| 4,263,636 | 4/1981 | Testone | 361/230 |
| 4,271,451 | 6/1981 | Metz | 361/213 |
| 4,498,116 | 2/1985 | Saurenman | 361/213 |
| 4,502,091 | 2/1985 | Saurenman | 361/213 |
| 4,974,115 | 11/1990 | Breidegam et al. | 361/231 |
| 5,034,651 | 7/1991 | Domschat | 313/351 |
| 5,057,966 | 10/1991 | Sakata et al. | 361/213 |
| 5,501,899 | 3/1996 | Larkin | 428/288 |

*Primary Examiner*—Edward H. Tso
(74) *Attorney, Agent, or Firm*—Fenwick & West LLP

(57) ABSTRACT

An ionizing bar assembly having a plastic housing with two individual ionizing electrode modules disposed on opposite sides. The ionizing electrode modules each include a plurality of printed circuit boards having signal traces thereon with ionizing electrodes or pins extending therefrom. The printed circuit boards are electrically coupled together by conductive rods or tubing positioned adjacent to the traces on the boards and soldered at various positions along the traces. The ionizing electrode modules are placed at opposing angles and are offset laterally from each other in such a way that the ionizing electrodes or pins extending from one module are located between the ionizing electrodes or pins extending from the opposite module, with the tips of each aligned along a common central linear axis.

44 Claims, 11 Drawing Sheets

PIEZOELECTRIC/ELECTROSTRICTIVE DEVICE AND METHOD OF MANUFACTURING SAME

This application claims benefit of Prov. No. 60/124,231 filed Mar. 12. 1999.

FIELD OF THE INVENTION

The invention relates to the field of air ionizers which may be used as static eliminators, and more particularly to a variable length ionizing bar and method of constructing the same, for neutralizing static electricity on moving materials, often in a form of a web or sheets of paper and/or plastic material.

BACKGROUND OF THE INVENTION

Ionizing bars are used to generate positive and negative ions which may be used to eliminate built-up electrostatic charges on various items such as paper and/or plastic film products. Typically, when used to eliminate built-up electrostatic charges on paper or plastic film products, long webs or sheets of the paper or plastic film product are passed over or under the ionizing bar in order to remove static charges. Due to the variation in width of a wide variety of paper and plastic film products, the width of the running webs and sheets varies from a few inches to several feet. As a result, a wide range of lengths of ionizing bars must be custom manufactured, usually on a short notice.

Numerous ionizing bar designs and production techniques have been described in the art, including those set forth in the following U.S. patents: D. Koerke U.S. Pat. No. 3,551, 743; D. Simons, U.S. Pat. No. 3,585,448; M. Iosue, et al., U.S. Pat. No. 3,652,897; H. Richardson, et al., U.S. Pat. No. 3,875,461; A. Testone, U.S. Pat. No. 3,921,037; A. Testone, U.S. Pat. No. 3,968,405; A. Testone, U.S. Pat. No. 4,031, 599; H. Bennecke U.S. Pat. No. 4,048,667; D. Simons, U.S. Pat. No. 4,216,518; A. Testone, U.S. Pat. No. 4,263,636; B. Metz, U.S. Pat. No. 4,271,451; D. Saureman, U.S. Pat. No. 4,498,116 and U.S. Pat. No. 4,502,091; K. Domschat, U.S. Pat. No. 5,034,651 and U.S. Pat. No. 5,057,966; W. Larkin, U.S. Pat. No. 5,501,899.

Certain known ionizing bars are comprised of a single elongated central high voltage electrode. The high voltage electrode is covered with an insulative or semiconductive sleeve and conductive sleeves. Emitter pins for generating the positive and negative ions extend outward from the electrode. In this type of known ionizing bar. a tubular metallic grounded housing surrounds the high voltage electrode. The metallic grounded housing includes an arrangement of cylindrical openings through which the emitter pins extend from the high voltage electrode.

Other prior art ionizing bars are comprised of a metal housing in the form of an elongated hollow metallic channel having a longitudinally extended opening. In this type of prior art ionizing bar, a high voltage electrode consisting of cable with an inner conductive core formed by a plurality of stranded wires is contained within the metallic channel of the housing. Emitter pins are formed on the outer layer of the cable by conductive paint.

Still other known ionizing bars include two or more parallel rows of metal electrodes with sharp emitter pins extending therefrom for generating, positive and negative ions on alternate rows.

Most of these prior art ionizing bars have a high voltage cable that is integral to the ionizing bar assembly and which is connected to a remotely-mounted high voltage power supply for providing power to the bar assembly. Second, although several of prior art ionizing bars do have connectors for removeably coupling a high voltage power supply to the ionizing bar, each of these connectors are located at only one end of the bar and are only suitable for a cable connection to the bar. Accordingly, a cable is coupled between the connector and the high voltage power supply. Additionally, in all of these prior art designs, the ionizing electrodes are located in a single row (positive and negative emitter pins alternating) or in two parallel rows with positive emitter pins arranged in parallel with negative emitter pins. Finally, in each of these designs all components of the bar, especially the housing, inner cables or bus rods. and insulators arc custom manufactured to a desired length.

Accordingly, it is would be desirable to provide an ionizing bar design which does not have a cable for connecting a high voltage power supply that is permanently hard-wired to the bar. Such a design should preferably include universal connectors at each end of the ionizing bar for coupling the bar directly to a power supply, or for coupling the ionizing bar to a power supply via a disconnectable extension cable. What is further needed is an ionizing bar design wherein the emitter pins are not arranged in a single row or in two parallel rows but are arranged in a more efficient configuration. What is further needed is a ioinizing bar design wherein multiple ionizing bars can be daisy chained together in order to achieve alternate lengths. Finally, what is needed is an ionizing bar design and a manufacturing method with would allow to pre-assemble a long ionizing bar assembly that will be ready to be cut to a customer-specified length and quickly shipped to the customer, rather that having to be custom assembled to a desired length.

The objective of this invention is to provide an ionizing bar that is, a) more reliable in operation, b) more economical and easy to manufacture, c) easy to connect to a high voltage power supply directly or via an extension cable, and d) a method of fabrication that provides shorter lead time to deliver bars to the customers.

SUMMARY OF THE INVENTION

In accordance with the present invention, an ionizing bar assembly is comprised of a plastic housing and two individual ionizing electrode modules disposed on opposite sides of the housing. The first ionizing electrode module receives voltage of a positive polarity when coupled to a source of high voltage power, thereby generating ions of a positive polarity. The second ionizing electrode module receives voltage of a negative polarity when coupled to the source of high voltage power, thereby generating ions of a negative polarity. The ionizing electrode modules each include a plurality of printed circuit boards having signal traces thereon with ionizing electrodes or pins extending therefrom. The plurality of printed circuit boards are electrically coupled together by conductive rods or tubing which are preferably positioned adjacent to the traces on the boards and soldered at various positions along the traces. The ionizing electrode modules on each side of the housing are placed at opposing angles and are offset laterally from each other in such a way that the ionizing electrodes or pins extending from one side are located between the ionizing electrodes or pins extending from the opposite side, with the tips of each aligned along a common central linear axis.

Each ionizing bar assembly preferably slides into two end blocks, which are each located at opposite ends of the bar assembly. The end blocks each include a recess having two pins therein and two socket connectors coupled to the pins at 90 degree angles and extending through a base in each of the two end blocks. The opposite ends of each of the pins extend horizontally through a back end of the end block. The pins are designed to engage with the conductive rods or tubing when the ionizing bar assembly is placed into the recess of the end blocks. The sockets are designed to removeably couple to a high voltage power source. The opposite ends of each of the pins may terminate or may be used for coupling to dual cabling for linking multiple ionizing bar assemblies together. Multiple ionizing bar assemblies may be daisy chained together such that a total length of any desired bar length may be achieved by adding or removing tonizing bar assemblies. The end blocks not only allow the length of any desired ionizing bar to be varied for use in different systems: but, the end blocks further allow assemblies to be easily coupled or removed from a high voltage power source because the high voltage power source is not hard wired to the ionizing bar assemblies.

DETAILED DESCRIPTION

In one preferred embodiment of the present invention, an ionizing bar assembly comprised of a plastic housing and two individual ionizing electrode modules disposed on opposite sides of the housing. The first ionizing electrode module receives voltage of a positive polarity when coupled to a source of high voltage power. thereby generating ions of a positive polarity. The second ionizing electrode module receives voltage of a negative polarity when coupled to the source of high voltage power, thereby generating ions of a negative polarity. The ionizing electrode modules each include a plurality of printed circuit boards having signal traces thereon with ionizing electrodes or pins extending therefrom. The plurality of printed circuit boards are electrically coupled together by conductive rods or tubing which are preferably positioned adjacent to the traces on the boards and soldered at various positions along the traces. The ionizing electrode modules on each side of the housing are placed at opposing angles and are offset laterally from each other in such a way that the ionizing electrodes or pins extending from one side are located between the ionizing electrodes or pins extending from the opposite side, with the tips of each substantially aligned along a common central linear axis.

Each ionizing bar assembly preferably slides into two end blocks, which are each located at opposite ends of the bar assembly. The end blocks each include a recess having two pins therein and two socket connectors coupled to the pins at 90 degree angles and extending through a base in each of the two end blocks. The opposite ends of each of the pins extend horizontally through a back end of the end block. The pins are designed to engage with the conductive rods or tubing when the ionizing bar assembly is placed into the recess of the end blocks. The sockets are designed to removeably couple to a high voltage power source. The opposite ends of each of the pins may terminate or may be used for coupling to dual cabling for linking multiple ionizing bar assemblies together. Multiple ionizing bar assemblies may be coupled together to achieve a total length of any desired bar length simply by adding or removing ionizing bar assemblies in a daisy-chain type configuration. The end blocks not only allow the length of any desired ionizing bar to be varied for use in different systems; but, the end blocks further allow assemblies to be easily coupled or removed from a high voltage power source because the high voltage power source is not hard wired to the ionizing bar assemblies.

Figure 1:
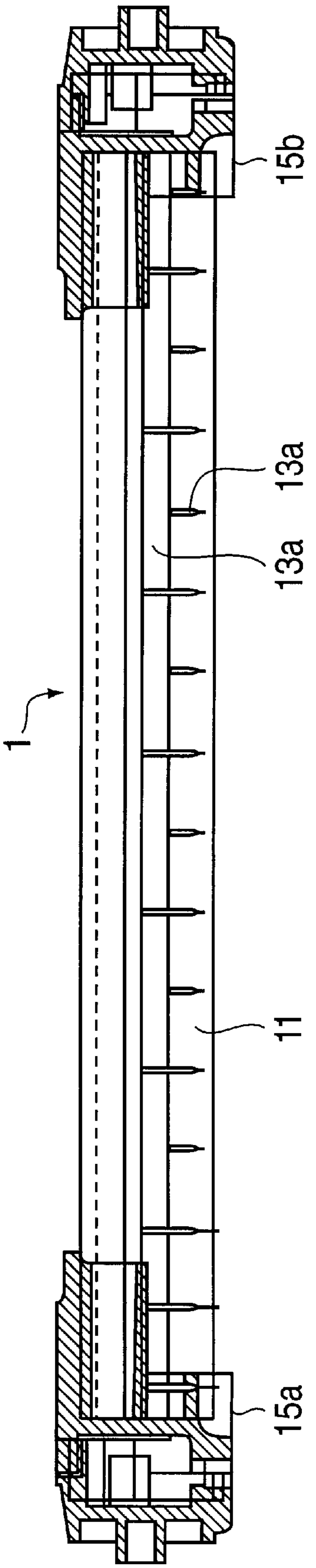
FIG. 1 shows a side sectional view of the ionizing bar assembly according to present invention.

FIG. 1 shows a side sectional view of an ionizing bar assembly in accordance with one preferred embodiment of the present invention. As shown. the ionizing bar assembly 1 includes an elongated rigid dielectric housing 11 which is preferably fabricated of plastic or any other electrically insulating material using any well known extrusion process. The ionizing bar assembly 1 further includes two identical ionizing electrode modules 13*a* and 13*b* which are located on opposite sides of the dielectric housing 11, and two identical end blocks 15*a* and 15*b*, located at opposite ends of the dieletric housing 11.

Figure 2:
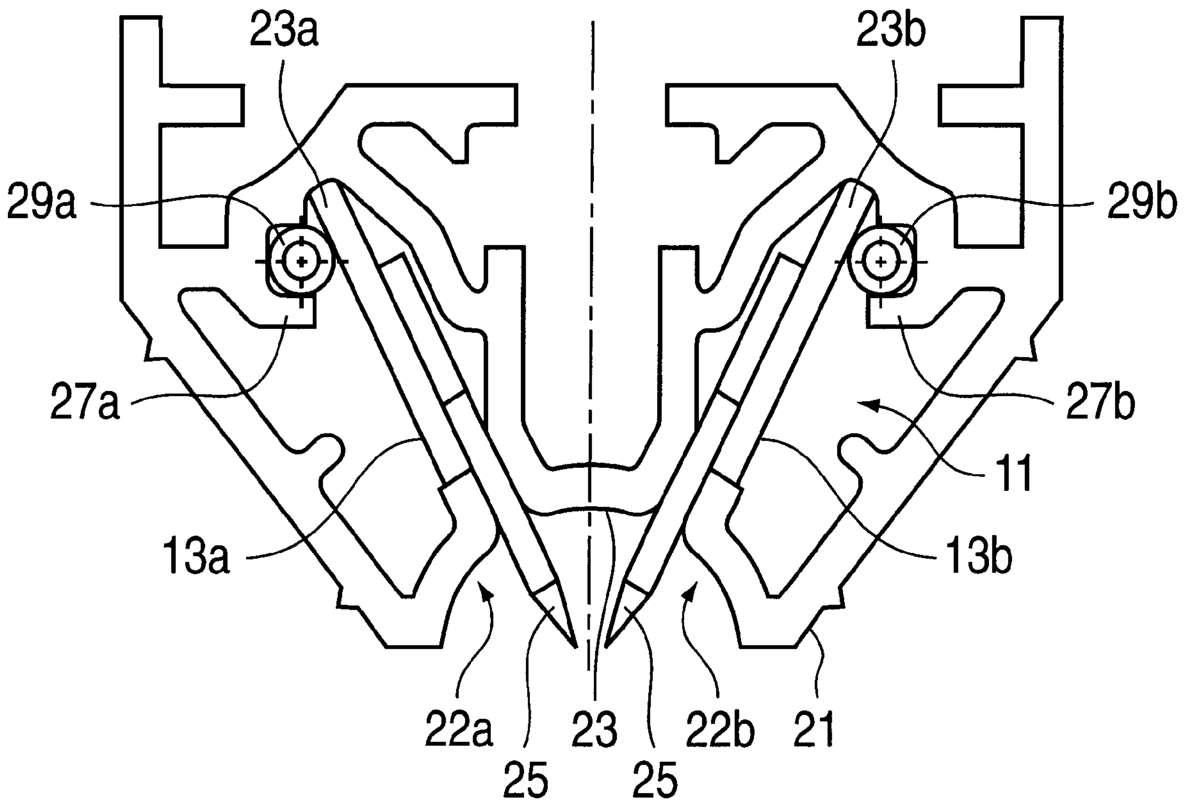
FIG. 2 shows an end sectional view of the ionizing bar sub-assembly according to present invention.

FIG. 2 shows a cross-sectional view of the ionizing bar assembly in accordance with one preferred embodiment of the present invention. As shown, the dielectric housing 11 has two symmetrical slots 22*a* and 22*b* which extend along the length of the dielectric housing 11. The symmetrical slots 22*a* and 22*b* are separated by an insulating barrier 23 located between them which also extends along the length of the dielectric housing 11. The symmetrical slots 22*a* and 22*b* receive two high voltage ionizing electrode modules 13*a* and 13*b* which are inserted securely into the symmetrical slots 22*a* and 22*b* and extend along the entire length of each slot. Each high voltage ionizing electrode module 13*a* and 13*b* includes a printed circuit board (PCB) component 23*a* and 23*b* and ionizing electrodes 25 extending therefrom. Components 23*a* and 23*b* are absolutely identical and are specified under two numbers for convenience only. It is understood that a single PCB component 23*a* or 23*b* has several ionizing electrodes 25 extending therefrom at regular intervals along the length of the PCB component 23*a* and 23*b*.

The ionizing electrodes 25 are in the form of tapered pins which are electrically coupled to PCB components 23*a* and 23*b*—i.e. the ionizing electrodes 25 are preferably soldered to the PCB components 23*a* and 23*b* along the length of the module at equal and regular intervals. The sharp ends of the ionizing electrodes 25 protrude through the narrow slots 22*a* and 22*b* that extend along the length of the dielectric housing 11. The ionizing electrode modules 13*a* and 13*b* are positioned at opposing angles toward each other and are offset from each other laterally in such a way that the ionizing electrodes 25 of one module 13*a* on a first side of the ionizing bar assembly 1 are located between the electrodes 25 of the opposing module 13*b* on the opposite side of the ionizing bar assembly 1, with the tips of each of the opposing electrodes 25 substantially aligned along a common linear axis running parallel to the ionizing bar assembly 1.

Preferably, the electrodes 25 are arranged at an angle facing each other so that the tips of the ionizing electrodes 25 are substantially aligned along the common linear axis which extends parallel to the center of the housing 11. Positioning the ionizing electrodes at an angle preferrably ranging from 30° to 120° toward each other and substantially aligning their tips along a straight central axis has several advantages over conventional electrode designs in which the electrodes are arranged in a row along the same plane. First, this arrangement helps maximize electrical field intensity between emitter pins of two electrodes of opposite polarity in order to improve ionization efficiency. Second. this arrangement also physically separates positive and negative electrode modules, increasing clearance and creepage distances between the conductors of opposite polarities and thus improving the reliability of the device.

The dielectric housing 11 and the high voltage ionizing electrode modules 13*a* and 13*b* can be made as long as necessary and practical. For example, the dielectric housing 11 can be extruded as long as tens of feet and longer, and then cut to a manageable length of 10–12 feet. Furthermore, even though it is possible to fabricate long strips of the PCB components 23*a* and 23*b*, it is not very practical. Accordingly, the PCB components 23*a* and 23*b* of the high voltage ionizing electrode modules 13*a* and 13*b* will be manufactured in smaller lengths, such as 12" or so, and multiple PCB components are then linked together, as will be further described later herein. In another embodiment of this invention, high-value high-voltage rated resistors are connected in series with the ionizing electrodes 25. The purpose of these resistors is to limit short-circuit current from the electrodes for safety, as well as to help stabilize corona discharge at the ionizing electrodes 25.

Figure 3A:
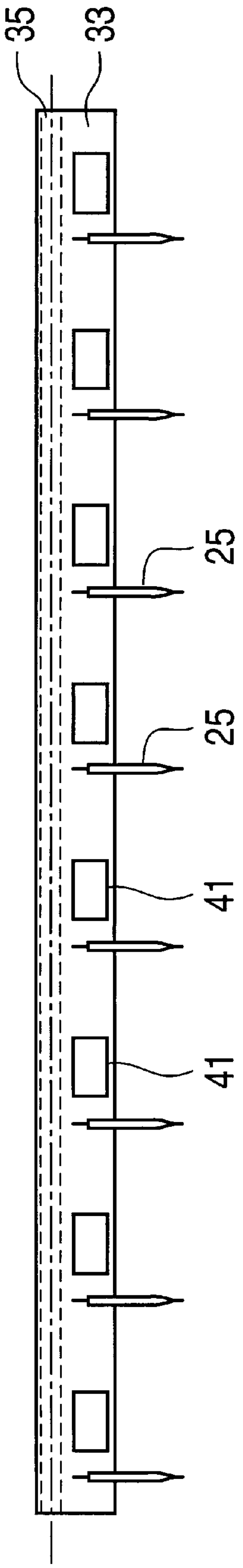
FIGS. 3A and 3B show side views of a printed circuit board electrode module assembly.
Figure 3B:
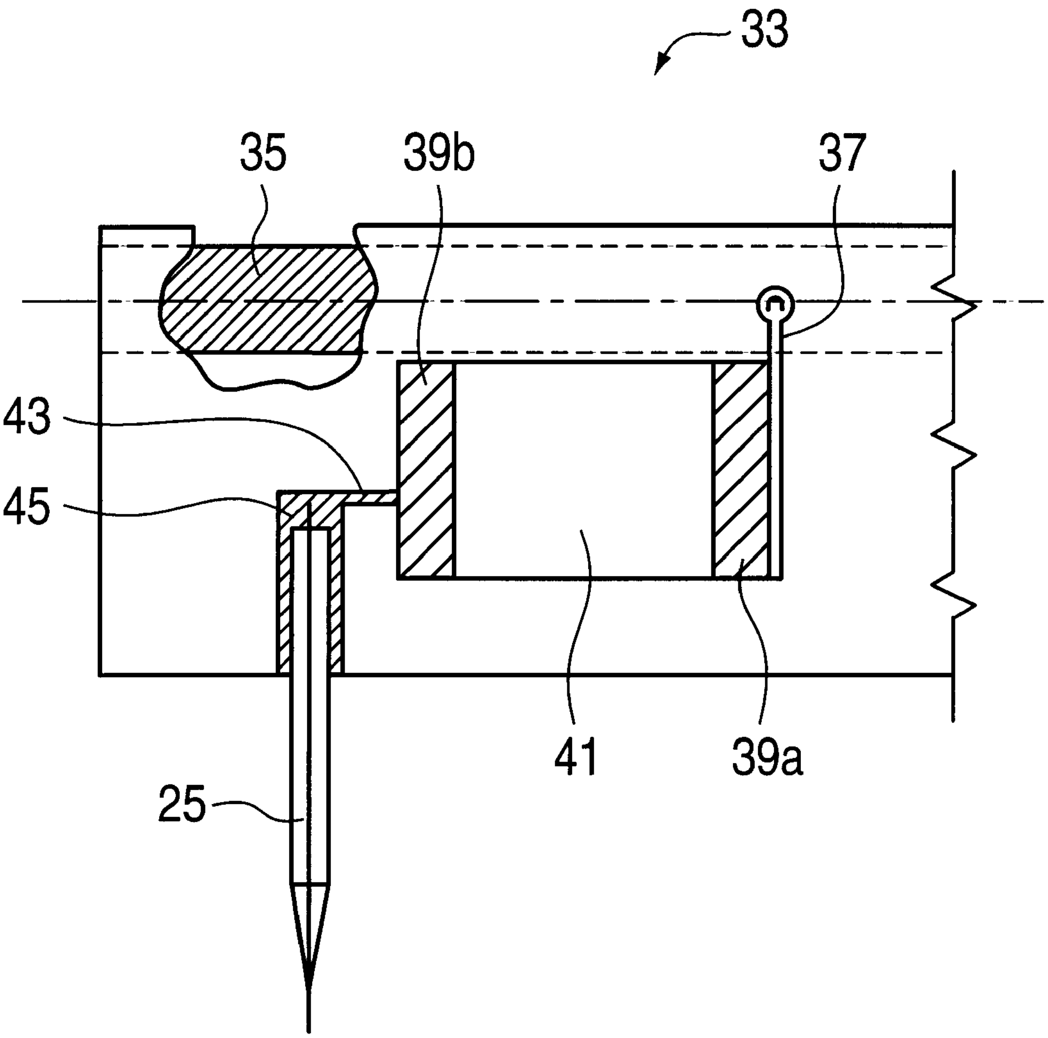

FIG. 3A shows a side view of a PCB component 23*a* with ionizing electrodes extending therefrom in accordance with a preferred embodiment of the present invention. FIG. 3B shows a close-up view of the PCB component 23*a* in order to illustrate how a single PCB component and ionizing electrodes 25 extending therefrom are coupled. Referring now to FIG. 3A, the PCB component 23*a* comprises a two-sided printed circuit board strip 33. Surface mount resistors 41 and electrodes 25 are mounted on one side of the printed circuit board strip 33. A bus trace 35 is located on the opposite side of the circuit board strip 33.

Referring now to FIG. 3B, the first side of the printed circuit board strip 33 is shown. with a cut out showing the bus trace 35 located on the opposite side of the board strip 33. As shown several smaller traces 37 are included on the first side of the board strip 33 and are positioned perpendicular to the bus trace 35 and extending from the bus trace 35. These smaller traces 37 are positioned at equal and regular intervals that can range from ½" to 4" apart from each other along the bus trace 35 depending upon the required density of ionization along the length of the bar. The smaller traces 37 are coupled to the bus trace 35 on the opposite side of the board strip 33 by a plated through hole. The smaller traces 37 electrically coupled the bus trace 35 to first ends 39*a* of surface-mount resistors 41 which are preferably soldered on the first side of the circuit board strip 33.

As further shown in FIG. 3B. additional small traces 43 connect opposite ends 39*b* of the surface mount resistors 41 to individual electrode pads 45. The ionizing electrodes 25 are soldered to these pads on the first side of the board strip 33. In this way, each of the ionizing electrodes 25 is electrically coupled to the bus trace 35 through a surface mount resistor 41. In a preferred embodiment, the ionizing electrodes 25 are made of stainless steel, tungsten, or some other metal. The electrodes 25 are machine tapered to a tip. Alternatively, the tip may be tapered using any electro-chemical etching process known in the art of wafer fabrication. Electro-chemical etching is preferred for tapering the electrodes 25 since this process provides a smoother surface that stabilizes ion current over time and helps lower the rate of emitter point contamination. If the electrodes 25 are made from stainless steel or tungsten, these metals may be difficult to solder to the first side of the board strip 33. In order to overcome this problem, the electrodes 25 can be electro-chemically plated with a nickel or gold layer. The plating of the electrodes 25 makes it possible to solder the electrodes to the electro pads 45 on the first side of the board strip 33. In applications characterized by dusty, chemically-aggressive environment, different plating material may be used for positive or negative electrodes. For example, negative ionizing electrodes may have emitter points plated with nickel, and positive electrodes which are typically more prone to contamination, may have emitter points plated with gold.

In a preferred embodiment, several PCB components 23 are coupled together in order to form a single high voltage ionizing electrode module 13*a* and 13*b*. The PCB components are arranged in a row with the bus traces on each individual PCB component 23 are butt-ended one to another inside the dielectric housing 11. Referring now again to FIG. 2, where a cross-section of the ionizing bar assembly 1 is shown, the dielectric housing 11 has two symmetrical details 27*a* and 27*b* which extend the length of the housing 11. Conductive rods 29*a* and 29*b*, or lengths of copper or brass tubing are disposed inside the details 27*a* and 27*b*. These conductive rods 29*a* and 29*b* are positioned in close contact with the bus traces 35 on each of the circuit board strips 33 of the PCB components 23*a* and 23*b*. Accordingly, multiple PCB components 23*a* and 23*b* are electrically coupled to one another by the engagement of the bus traces 35 on each of the circuit board strips 33 with the conductive rods 29*a* and 29*b*. In order to ensure reliable coupling of the conductive rods 29*a* and 29*b* with the bus traces 35, the conductive rods 29*a* and 29*b* may be soldered to the bus traces 35 at regular intervals along each of the PCB components 23*a* and 23*b*.

After the high voltage ionizing electrode modules 13*a* and 13*b* are securely inserted into the slots 22*a* and 22*b* within the dielectric housing 11, the outer walls 21 of the housing 11 close over the high voltage ionizing electrode modules 13*a* and 13*b*, locking the PCB components 23*a* and 23*b* inside the housing 11 and narrowing the slots 22*a* and 22*b* substantially to the diameter of the ionizing electrodes 25 which extend outward from the PCB components 23*a* and 23*b*. After the high voltage ionizing electrode modules 13*a* and 13*b* are each inserted into their respective slots 22*a* and 22*b* the slots are filled with an insulating sealant (not shown) in order to prevent industrial dirt and residue from entering inside the ionizing bar assembly 1. In a preferred embodiment, room temperature curing adhesive or heat curing or light curing adhesive is used as the insulating sealant.

Figure 4:
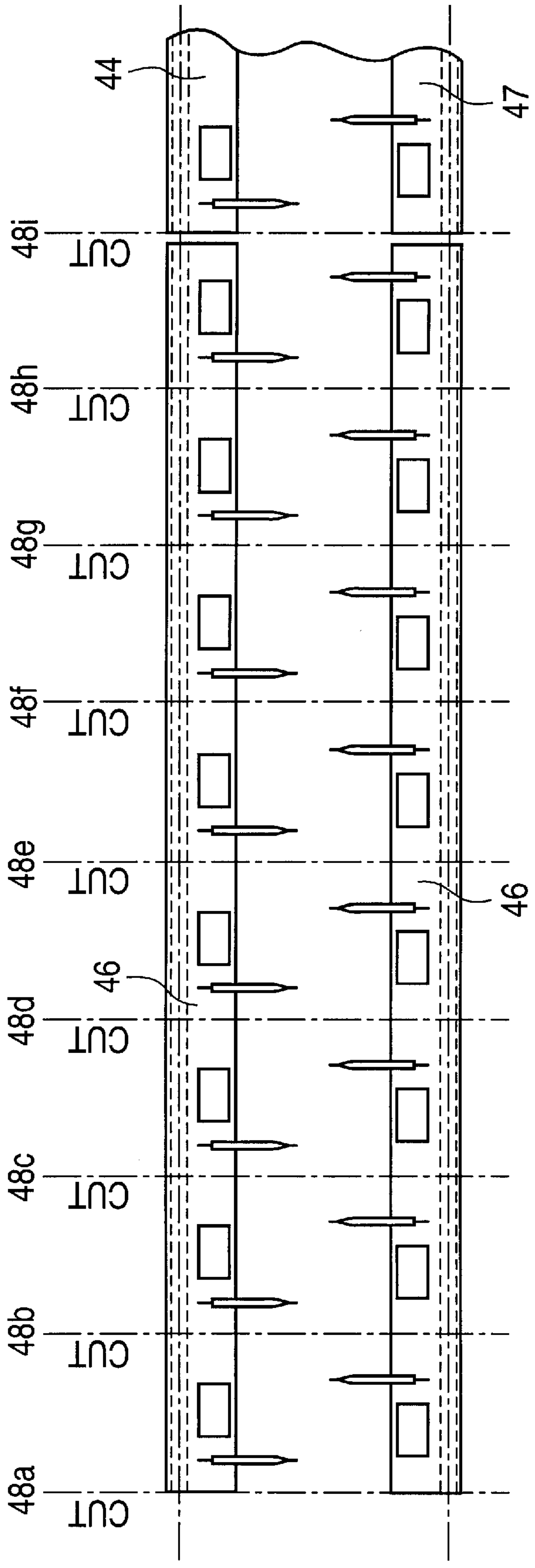
FIG. 4 is a diagram that shows possible locations where the ionizing bar sub-assembly can be cut into shorter sections.

It is noted that the ionizing bar assembly 1 may be manufactured in a long standard length of several feet. Once assembled. the ionizing bar assembly 1 can be cut into any desired length. FIG. 4 shows the preferred locations where the ionizing bar assembly 1 can be cut into shorter lengths. The locations where the ionizing, bar subassembly could be conveniently cut are indicated by numerals 48*a* through 48*i*. These locations preferably repeat at increments equal to the distance between neighboring ionizing electrodes in the electrode module on one side of the bar in order to ensure that there will always be an equal number of pairs of positive and negative electrodes. The cuts are made exactly in the center between the neighboring ionizing electrodes on both sides of the ionizing bar assembly 1 at locations where there are no surface mount resistors.

Referring again to the ionizing bar assembly 1 shown in FIG. 1, after the bar is cut to a desired length assembly of the bar is completed by placing two identical end blocks 15*a* and 15*b* on each end of the cut assembly. The end blocks 15*a* and 15*b* safely terminate the bus traces 35 on the high voltage ionizing electrode modules 13*a* and 13*b* and insulate the ends of the conductive rods 29*a* and 29*b*. The end blocks 15*a* and 15*b* further provide reliable electrical connection of a high voltage power supply to the bus traces 35 of the high voltage ionizing electrode modules 13*a* and 13*b* through the slotted pin assemblies contained within the end blocks 15*a* and 15*b*. Finally, the end blocks 15*a* and 15*b* facilitate the mechanical attachment of the ionizing bar assembly 1 to the production equipment where the bar is to be installed and utilized.

Figure 5A:
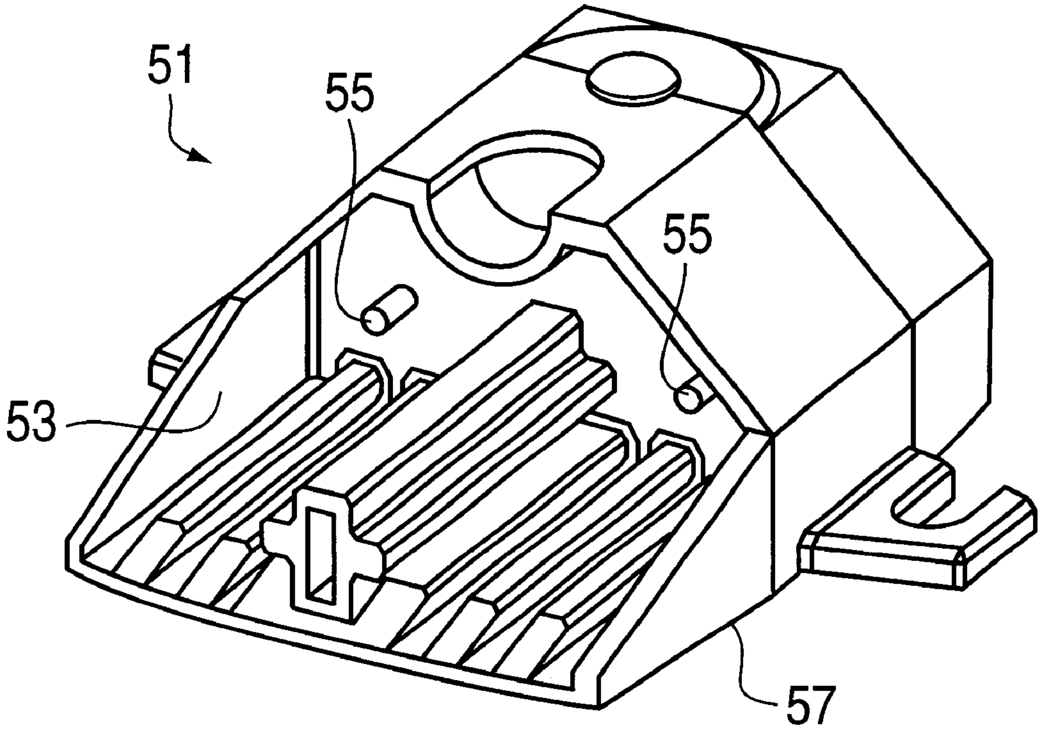
FIG. 5A shows an isometric view of an end block used in a preferred embodiment of the ionizing bar assembly of the present invention.

FIG. 5A shows an isometric view of an end block 51 used in a preferred embodiment of the ionizing bar assembly of the present invention. The end block 51 can be molded out of dielectric polymer materials, such as ABS, PVC, or any other dielectric polymer known in the art. The end block 51 includes a recess 53 in the cross-sectional shape of the dielectric housing 11, such that the ends of the housing slide inside the recess 53 in each of the two end blocks 51. The end block 51 further includes two pin connector assemblies 55 that can be either insert-molded or inserted into a rear side of the end block 51. The pin connector assemblies 55 engage with the conductive rods 29*a* and 29*b* (i.e. the slotted pins 56 will fit securely within the copper tubing) when the housing 11 slides into the recess, thereby electrically coupling the pin connector assemblies 55 to the bus traces 35 of the high voltage ionizing electrode modules 13*a* and 13*b*.

Figure 5B:
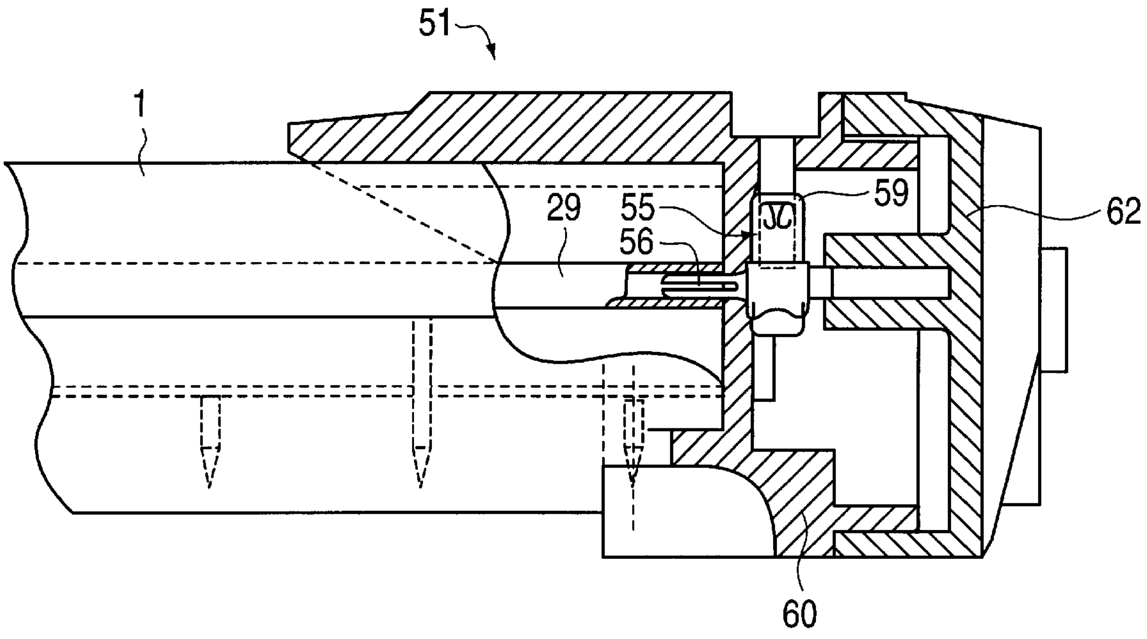
FIG. 5B shows a cross-sectional side view of an end block used in a preferred embodiment of the present invention.

FIG. 5B shows a cross sectional side view of an end block 51 used in a preferred embodiment of the ionizing bar assembly of the present invention. As shown, the pin connector assemblies 55 are preferably slotted pins and socket assemblies which include a slotted pin 56 that fits securely into the metal tubing (i.e. the conductive rod 29*a*) while the socket 59 extends vertically upward through the end block 51 when the end block 51 is secured to the end of the ionizing bar assembly 1. The sockets 59 are accessible via holes or openings molded into the end blocks 51. In a preferred embodiment, the end block 51 is designed in two individual portions, a bar-side portion 60 (where the recess is located) and mount-side portion 62 (where the bar may be coupled to the apparatus or to another bar using cabling, as will be described further hereinafter). The two portions will telescope into each other and be secured together using epoxy or another type of adhesive.

Figure 6A:
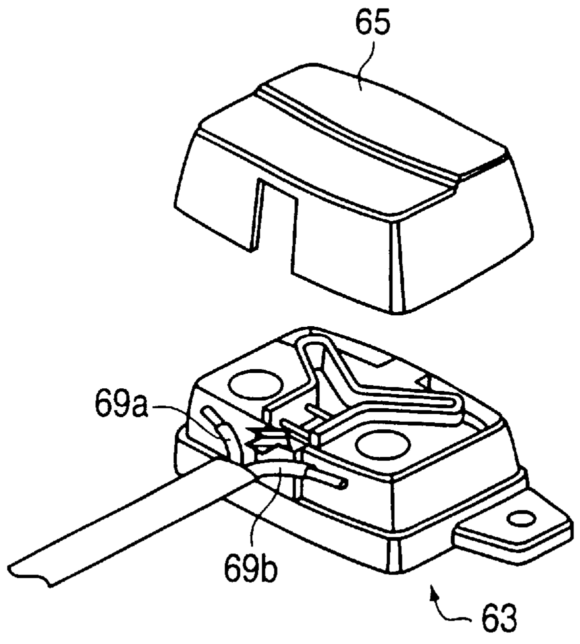
FIGS. 6A and 6B show isometric views of a preferred embodiment of a cable plug.
Figure 6B:
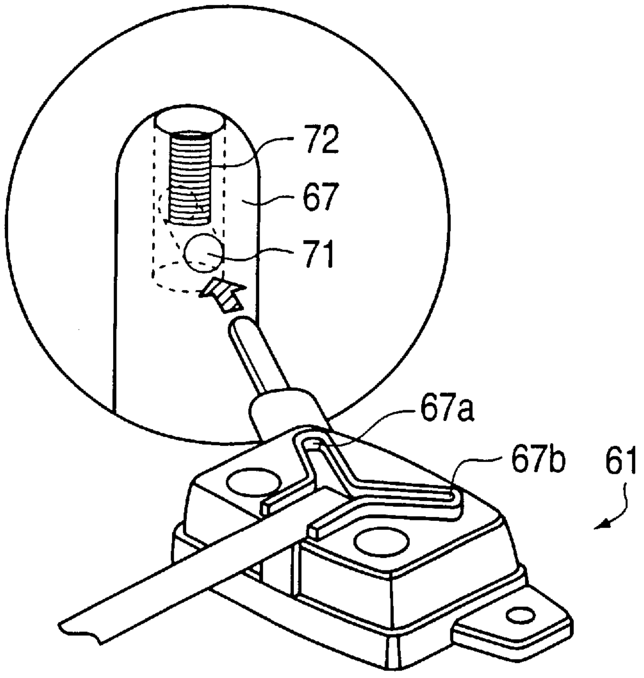

A source of high voltage can be connected to the ionizing bar assembly 1 directly via the sockets 59 or may be coupled to the ionizing bar assembly 1 via a cable connected between the power supply and the sockets 59 in the end block 51. If cabling is used, the cable will preferably have cable plugs on each end for coupling to the sockets 59. FIG. 6 shows a preferred embodiment of a cable plug 61 with a cable attached to it which may used to couple a high voltage power supply to the ionizing bar assembly. As shown, the cable plug 61 consists of a base 63 and a cover 65 which are formed as two plastic molded parts. In the base, there are two socket connectors 67*a* and 67*b* inserted into two holes. The sockets in the cable plug 61 are identical to the sockets 59 in the end blocks 51, and the distance between the sockets in both components is identical. The two cables 69*a* and 69*b* are cut to the desired length and their ends are stripped of insulation. The center conductor of each cable 69*a* and 69*b* is inserted into a through hole 71 formed at the outer end of the corresponding socket and then secured with a set screw 72. The base of the cable plug and the cover are joined together with two self-tapping screws from the base side of the assembly.

Figure 7:
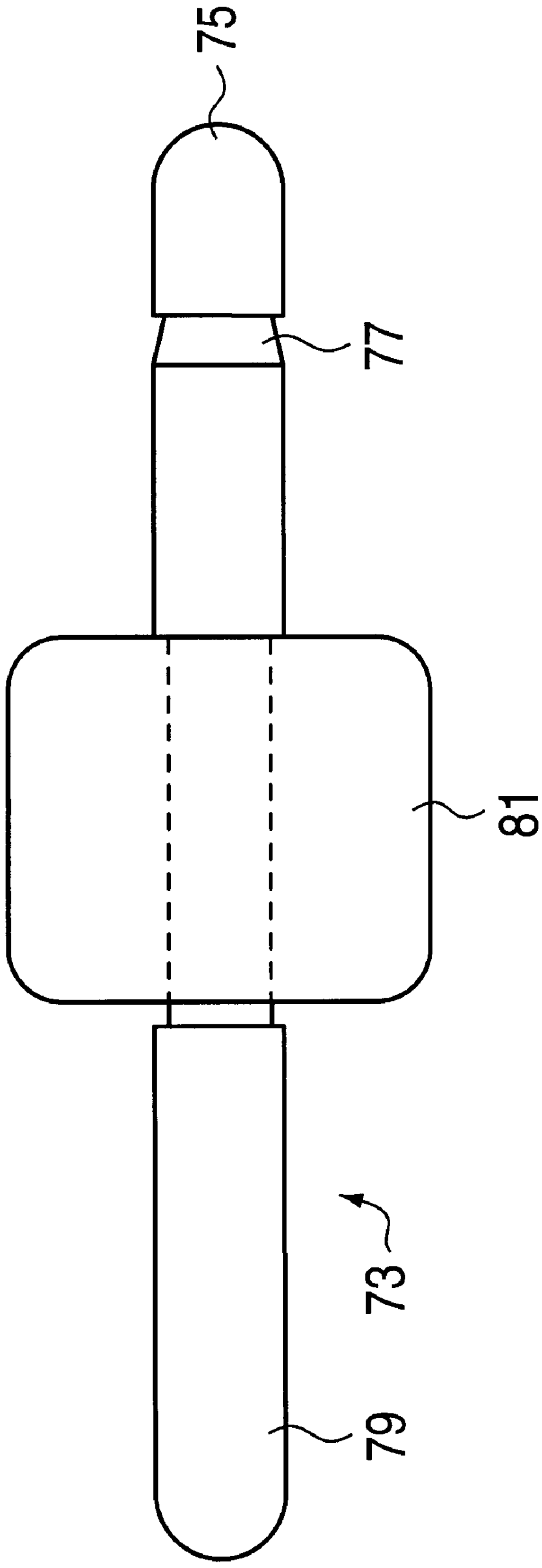
FIG. 7 shows a side view of a double-ended pin assembly.

In an alternative embodiment, the socket connecters on the end blocks 51 may be converted into male pins using double-ended pin assemblies. FIG. 7 shows a double-ended pin assembly 73 which may be is used to change the female socket connectors in the end blocks 51 into male pin connectors. A first end 75 of the double-ended pin 73 has a machined groove 77. A second and opposite end 79 of the double-end pin 73 is preferably smooth. A grommet 81 made of an elastic material is securely fastened around the middle portion of the double-end pin 73. In a preferred embodiment, the sockets used in the end blocks 51 are each equipped with a contact, such as #08 contact manufactured by Mill-Max Mfg. Corp., which is press fit inside the barrel of the socket. The machined groove 77 located at the first end 75 of the double-ended pin 73 is formed to slip through the contact when engaged in the sockets in the end block 51. The fingers of the contact will engage into the machined groove 77 and prevent easy removal of the double-ended pin out of the socket in the end block 51. When the grooved end 75 of the double-ended pin 73 is engaged into the socket it may sustain up to a 20 lb force tension without coming loose in order to insure a fail safe connection. The second and opposite end 79 of the double-ended pin 73 has a smooth surface which preferably couples to the cable plug of a high voltage power supply or an extension cable.

Figure 8:
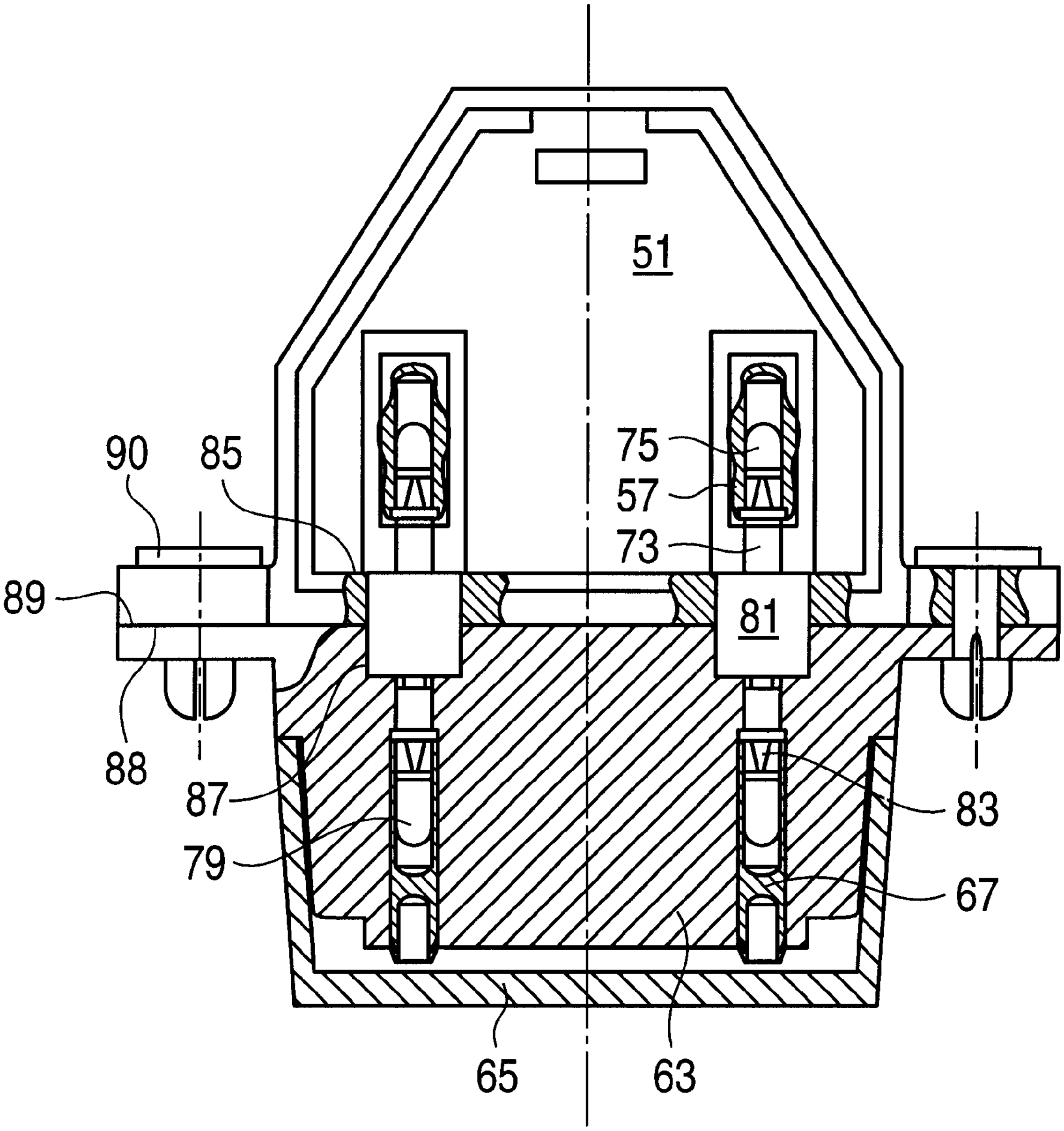
FIG. 8 shows the preferred embodiment for using a double-ended pin assembly to engage an end block of the ionizing bar assembly and a cable plug coupled to a high voltage power supply.

FIG. 8 illustrates double-ended pins 73 engaged between an end block 51 of an ionizing bar and a cable plug 61 coupled to a high voltage power supply for supplying power to the ionizing bar assembly 1. As shown, the end block 51 has two sockets 59. and the cable plug 61 also has two sockets 67. The double-end pins 73 are inserted into the end block 51 of the ionizing bar with the grooved ends 75 inside. The fingers of the contact 83 allow the grooved end 75 to pass through. However, the double-ended pins 73 are securely held in place by the fingers of the contact 83 which engage into the groove 77 and prevent extraction of the pin. Therefore, the end block of the bar becomes a male connector in the illustrated configuration. The socket 67 of the cable plug 63 accepts the smooth end 79 of the double-end pin 73. The extraction force of the pin inserted with its smooth end is low, and upon separation of the cable plug from the end block 51 of the ionizing bar assembly 1 the double ended pins 73 remain locked within the end block 51. In other words, the cable plug will remain a female connector. As a result, the cable plug that attaches the high voltage cables to the ionizing bar will not have any exposed high voltage pins if the cable plug is disconnected from the ionizing bar assembly 1. This provides an additional safety measure and makes it easier and safer to connect/disconnect the ionizing bar from the application system. The grommet 81 that is placed over the middle portion of the double-end pins 73 engages and seals the interface between the end block 51 and the connector plug. In a preferred embodiment, the two parts are mechanically held together with a plastic snap-in fastener 90.

Figure 9A:
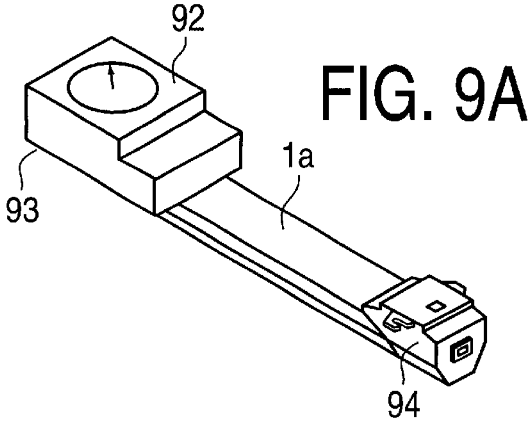
FIGS. 9A, 9B, and 9C each show various interconnecting combinations of a power supply and ionizing bars according to the present invention.

Referring to FIG. 9, the ionizing bar assembly of the present invention has several advantages. First, a removeable power supply 92 with output sockets can be directly connected to one of the end blocks 93 of the ionizing bar 1*a,* with double-ended pins coupled between the sockets in the end block 93 and the high voltage power supply 92 in order to safely secure the removeable power supply 92 to the end block 93. The opposite end block 94 may terminate with sockets at the end block 94 without any double-ended pins inserted therein. This configuration is illustrated in FIG. 9*a*.

Figure 9B:
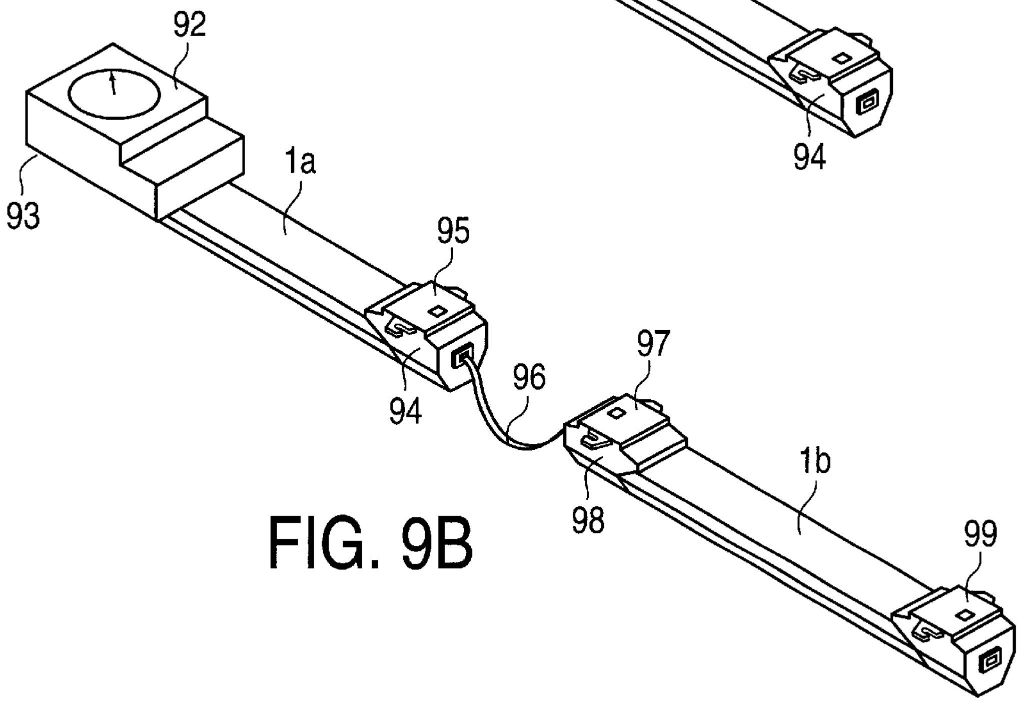

Alternatively, a high voltage power supply 92 with output sockets can be directly connected to one of the end blocks 93 of the ionizing bar 1*a,* with double-ended pins coupled between the sockets in the end block 93 and the high voltage power supply 92. The second end block 94, located at an opposite end of the ionizing bar 1*a,* always terminates with connector sockets for safety. A cable plug 95. of an extension cable 96, can be used at the end block 94 in order to couple a second ionizing bar 1*b* assembly to the first ionizing bar assembly 1*a*. The cable plug 95 has pins. A cable plug 97 has sockets that would connect to the pins in the end block 98 of the second bar 1*b*. An extension cable, similar to a bar, always has sockets at the open energized end. An opposite end block 99 in the second ionizing bar assembly 1*b* terminates with sockets at the end block 99 without any double-ended pins inserted therein. This configuration is illustrated in FIG. 9*b*.

Figure 9C:
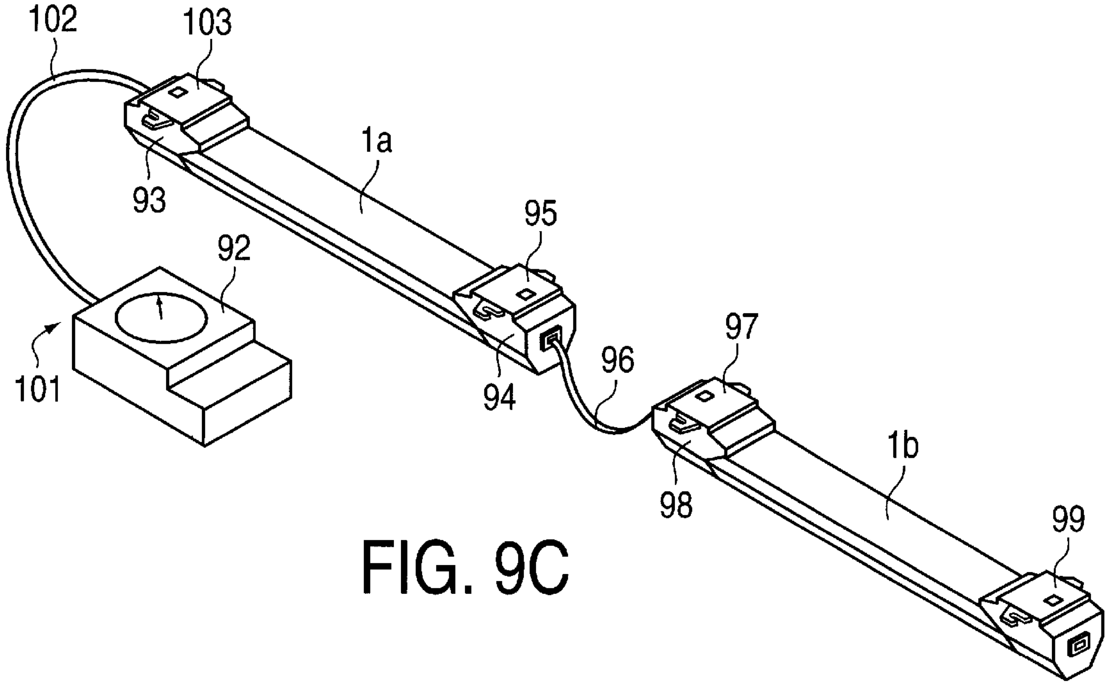

Finally, a high voltage power supply 92 with output sockets may be connected to a first cable plug 101 at a first end of a first extension cable 102. The first cable plug 101 has double-end pins inserted into its sockets with the grooved ends inside in order to safely secure the first cable plug 101 to the power supply 92. A second cable plug 103, located at the other opposite end of the first extension cable 102 preferably has output sockets. The second cable plug 103 connects to a first end block 93 of a first ionizing bar 1*a,* the first end block 93 preferably has double-ended pins inserted into its sockets with the grooved ends inside. The first cable plug 95 of the second extension cable 96 is connected to the second end block 94 of the first ionizing bar 1*a,* located at the opposite end of the ionizing bar 1*a*. The second cable plug 97 on the other end of the second extension cable 96 connects to the first end block 98 of the second ionizing bar 1*b*. The opposite end block 99 of the second ionizing, bar 1*b* terminates with output sockets. This configuration is illustrated in FIG. 9*c*.

From the above description. it will be apparent that the invention disclosed herein provides a novel and advantageous ionizing bar assembly and method of fabricating the same. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is laimed is:

1. An ionizing bar assembly comprising:

an elongated dielectric housing having a pair of elongated slots separated by an elongated barrier; and ionizing electrode modules disposed on opposite sides of the housing within each of the pair of elongated slots, said ionizing electrode modules including conductive bus elements with emitter pins attached thereto to extend from the slots at selected locations therealong at converging angles toward each other.

2. The ionizing bar assembly of claim 1 comprising an end block of dielectric material positioned at an end of the dielectric housing over the ionizing electrode modules disposed thereat.

3. The ionizing bar assembly of claim 1, wherein the ionizing electrode modules comprise:

printed circuit boards having bus elements thereon with the emitter pins attached thereto and extending therefrom, and the assembly comprises:

conductors positioned in contact with the bus elements of the ionizing electrode modules for electrically coupling to the printed circuit boards.

4. The ionizing bar assembly of claim 3, wherein the bus elements are each located on a first side of each of the printed circuit boards and the emitter pins extending therefrom are attached to electrode pads mounted on a second side of each of the printed circuit boards, said electrode pads being electrically coupled to the bus elements via traces located on the second sides of the printed circuit boards and via conductors through the printed circuit boards which connect the traces on the second sides to the bus elements on the first sides.

5. The ionizing bar assembly of claim 4 including resistors connecting each of the electrode pads on the second side of each of the printed circuit boards and the bus elements on the first side.

6. The ionizing bar assembly of claim 1, wherein the emitter pins of the ionizing electrode modules located in the slots of the housing are offset from each other in the elongation direction to interspace the emitter pins extending from the ionizing electrode modules disposed in the pair of slots.

7. The ionizing bar assembly of claim 2 in which the end block includes:

a pair of connectors disposed to form electrical connections to the conductive bus elements of ionizing electrode modules at the end of the housing.

8. The ionizing bar assembly of claim 7, wherein each of the pair of connectors comprises:

a conductive slotted pin positioned in the end block to form slidable electrical connection with the conductive bus element of an ionizing electrode module at the end of the dielectric housing in response to slidable engagement therewith of the end block for supplying high positive and negative voltages through the end block to the ionizing electrode modules disposed in the pair of slots in the housing.

9. A method for fabricating an ionizing bar assembly comprising:

forming an elongated dielectric housing having a pair of elongated slots therein separated by a barrier therebetween;

forming ionizing electrode modules each with a conductive bus disposed along the length thereof and with emitter pins connected to and extending laterally therefrom; and securing the ionizing electrode modules in the slots in the housing with the emitter pins protruding therefrom at converging angles.

10. The method of claim 9, further comprising the step of cutting the housing transverse to the slots at a desired length after securing the ionizing electrode modules in the slots.

11. The method of claim 10 further comprising the steps of:

forming dielectric end blocks each having a recess for slidably receiving therein an end of the dielectric housing, and each having a connector assembly herein disposed to connect with the ionizing electrode modules in the slots;

sliding an end block over an end of the desired length of dielectric housing with the connector assembly in contact with the conductive bus of each of said ionizing electrode modules; and sliding another end block over an opposite end of the housing with the connector assembly in contact with the conductive bus of each of said ionizing electrode modules.

12. The method claim 9, wherein the ionizing electrode modules are secured in the slots with the emitter pins extending laterally therefrom at converging angles toward each other with tips of the emitter pins substantially aligned and longitudinally interspaced along a common central axis.

13. The method of claim 9, wherein the step of forming the ionizing electrode modules comprises:

fabricating printed circuit boards each having a bus trace on one side and having the emitter pins coupled to the bus trace and extending from the opposite side; and arranging the printed circuit boards in the slots with the bus traces on each board in a slot forming a continuous electrical circuit substantially along the desired length of the housing.

14. The method of claim 9, wherein the step of forming ionizing electrode modules comprises:

fabricating a plurality of printed circuit boards each having a bus trace on one side and emitter pins extending therefrom on the opposite side electrically coupled to the bus trace on the one side of the printed circuit boards; and arranging the plurality of printed circuit boards side by side in the slots of the housing with the bus traces on each board electrically coupled together with all of the boards in a slot.

15. The method of claim 9 in which the step of securing includes longitudinally offsetting the ionizing electrode modules in one of the pair of slots from the ionizing electrode modules in the other of the pair of slots to interspace the emitter pins extending from each of the ionizing electrode modules.

16. The method of claim 11 further comprising the steps of:

forming an additional ionizing bar assembly of desired length;

sliding end blocks over ends of the dielectric housing of the additional ionizing bar assembly; and electrically coupling to the ionizing electrode modules in corresponding slots of the dielectric housings through the end blocks.

17. The ionizing bar assembly of claim 7 comprising:

a pair of said end blocks located at each end of the housing to form electrical connections to the bus elements of the ionizing electrode modules in the slots at each end of the housing.

18. The ionizing bar assembly of claim 17 comprising an additional ionizing bar assembly having conductive bus elements of ionizing electrode modules therein electrically connected through respective end blocks to the conductive bus elements of the ionizing electrode modules of said ionizing bar assembly.

19. The ionizing bar assembly of claim 3 in which the ionizing electrode modules include a plurality of said printed circuit boards disposed in substantially contiguous array along the elongated slots with the bus elements thereof connected via the conductors in contact therewith.

20. The ionizing bar assembly of claim 8 in which each of the pair of connectors includes a conductive socket disposed behind an aperture within the recess of the end block, and includes the conductive slotted pin slidably attached to the conductive socket through the aperture.

21. An ionizing bar assembly comprising:

an elongated housing having a number of elongated slots and a plurality of emitter pins extending therefrom along the length of the housing;

an ionizing electrode module disposed within each of the number of elongated slots with emitter pins attached to each module to extend from the number of slots at selected locations therealong; and a conductor positioned uniformly along each of the number of slots in contact with the ionizing electrode module disposed therein.

22. The ionizing bar assembly of claim 21, comprising:

an end block of dielectric material positioned at an end of the dielectric housing to provide external electrical connection to the conductor in each of the number of slots.

23. The ionizing bar assembly of claim 21 comprising:

a plurality of the ionizing electrode modules, each including a printed circuit board having a bus element thereon with the emitter pins attached thereto and extending therefrom; and each of the conductors is positioned in contact with the bus elements of the printed circuit boards for connecting together the ionizing electrode modules disposed within a slot.

24. The ionizing bar assembly of claim 23 in which the plurality of ionizing electrode modules are disposed in substantially contiguous array along each of the number of elongated slots with the bus elements thereof connected via each of said conductors in contact therewith.

25. The ionizing bar assembly of claim 23 in which the bus elements are each located on a first side of each of the printed circuit boards and the emitter pins extending therefrom are attached to electrode pads mounted on a second side of each of the printed circuit boards; and the electrode pads are electrically coupled to the bus elements via traces located on and through the printed circuit boards to connect the electrode pads on the second sides to the bus elements on the first sides.

26. The ionizing bar assembly of claim 25 comprising:

resistors connecting each of the electrode pads on the second side of each of the printed circuit boards and the bus elements on the first side.

27. The ionizing bar assembly of claim 21 in which the housing includes a pair of elongated slots; and the set of emitter pins of the ionizing electrode modules located in one of the pair of slots are offset in the elongation direction from the set of emitter pins of the ionizing electrode module in the other of the pair of slots to interspace the emitter pins extending from the ionizing electrode modules disposed in the pair of slots.

28. The ionizing bar assembly of claim 27 in which the sets of emitter pins of the ionizing electrode modules are disposed to extend from the slots at converging angles toward each other.

29. The ionizing bar assembly of claim 22 comprising:

a pair of end blocks located at opposite ends of the housing to form external electrical connections at each end of the housing to the conductors within a pair of slots.

30. The ionizing bar assembly of claim 29 comprising:

an additional ionizing bar assembly having conductors in contact with bus elements of ionizing electrode modules within elongated slots therein; and electrical connections through respective end blocks between the conductors in contact with the ionizing electrode modules of said ionizing bar assembly and in contact with the ionizing electrode modules of said additional ionizing bar assembly.

31. The ionizing bar assembly of claim 22 in which the conductor is hollow:

the housing includes a pair of elongated slots with the hollow conductor positioned uniformly along each of the pair of slots; and at least one of the end blocks including a pair of connectors each including a conductive slotted pin positioned in the end block to form a slidable electrical connection within the hollow conductor in a slot at the end of the dielectric housing in response to slidable engagement of the end block with the housing to form an external electrical connection for supplying high positive and negative voltages through the end block to the conductors in contact with the ionizing electrode modules disposed within the pair of slots in the housing.

32. The ionizing bar assembly of claim 31 in which each of the blocks includes a pair of connectors that each includes a conductive socket disposed behind an aperture in the end block, and in that the conductive slotted pin attaches to the conductive socket.

33. The ionizing bar assembly of claim 32 comprising:

a conductive double-ended pin inserted and secured in each of the conductive sockets in one of the end blocks to protrude through the aperture.

34. The ionizing bar assembly of claim 33 in which the end block with the protruding double-ended pins removably couple to a source of high ionizing voltage for providing high ionizing voltage to the ionizing electrode modules.

35. The ionizing bar assembly of claim 34 comprising:

an additional ionizing bar assembly; and the conductive sockets in the end block are electrically coupled to the conductive pins in the end block of the additional ionizing bar assembly to provide a total length of ionizing bar assemblies electrically coupled together to receive the high ionizing voltages.

36. A method for fabricating an ionizing bar assembly including an elongated dielectric housing having a number of elongated slots therein, comprising:

forming a plurality of ionizing electrode modules each with a conductive bus disposed along the length thereof and with emitter pins connected to and extending laterally therefrom;

securing the plurality of ionizing electrode modules in contiguous array within each of the number of slots in the housing with the conductive buses of the ionizing electrode modules in a slot electrically connected together; and cutting the housing transverse to the number of slots at a desired length after securing the ionizing electrode modules in each of the number of slots.

37. The method of claim 36 comprising:

forming dielectric end blocks each having a recess for receiving therein an end of the dielectric housing, and each having a connector assembly therein disposed to connect with the conductive buses on ionizing electrode modules in the slot that are connected together;

attaching an end block to an end of the desired length of dielectric housing with the connector assembly in contact with the conductive buses in each of the number of slots; and attaching another end block to an opposite end of the housing with the connector assembly in contact with the conductive buses in each of the number of slots.

38. The method claim of 36 in which the ionizing electrode modules are secured in a pair of slots with the emitter pins extending therefrom at converging angles toward each other with tips of the emitter pins substantially aligned and longitudinally interspaced along a common central axis.

39. The method of claim 36 comprising:

positioning a conductor uniformally along the length of each of the number of slots for electrically contacting ionizing electrode modules secured in such slot.

40. The method of claim 39 in which the ionizing electrode modules are formed as printed circuit boards fabricated with a bus trace on one side, and with the emitter pins coupled to the bus trace and extending from the opposite side; and the printed circuit boards are arranged in each of the number of slots with the bus traces on each printed circuit board in a slot in electrical contact with the conductor therein for forming a continuous electrical circuit along the length of the housing.

41. The method of claim 39 comprising:

fabricating a pair of dielectric end blocks each having a recess for receiving therein ends of the dielectric housing with the ionizing electrode modules secured therein; and disposing at least one electrical connector in the end blocks for connecting within the recess to the conductor at the end of the housing that is in electrical contact with ionizing electrode modules to form an external electrical connection for supplying high ionizing voltage thereto.

42. The method of claim 37 in which in each end block, each connector assembly includes a pair of electrically coupled conductive connectors encased in the end block for connecting at the end of the housing to the conductive buses of ionizing electrode modules secured in a slot, with one of the pair of conductive connectors accessible from within the recess and the other of the pair of conductive connectors accessible from another surface of such end block; and one end block is attached to one end of the housing with the conductive bus of an ionizing electrode module in one slot electrically connected to the one of the pair of conductive connectors; and another end block is attached to an opposite end of the housing with the conductive bus of an ionizing electrode module in the one slot electrically connected to the one of the pair of conductive connectors for providing external electrical connections to the conductive buses of ionizing electrode modules in a slot at the one and opposite ends of the housing through the other of the pair of conductive connectors accessible from other surfaces of the end blocks.

43. The method of claim 42 comprising:

forming an additional ionizing bar assembly of desired length;

attaching end blocks to ends of the housing of the additional ionizing bar assembly; and electrically coupling the conductive buses of ionizing electrode modules in slots within the separate housings of the ionizing bar assembly and the additional ionizing bar assembly through the others of the pairs of conductive connectors accessible from such other surfaces of end blocks attached to the separate housings.

44. A method for removing electrostatic charges from a moving dielectric web using an ionizing bar assembly as in claim 22 in which the elongated housing is disposed transverse to the movement of the dielectric web with the emitter pins positioned in close proximity to a surface of the web; and high ionizing voltages are applied to the ionizing electrode modules disposed in each of the number of slots to form ions in the vicinity of the surface of the web adjacent the tips of the emitter pins positioned in substantial alignment along a transverse axis relative to movement of the web.

* * * * *

UNITED STATES PATENT AND TRADEMARK OFFICE

CERTIFICATE OF CORRECTION

PATENT NO. : 6,330,146 B1 
DATED : December 11, 2001
INVENTOR(S) : Mark Blitshteyn et al.

It is certified that error appears in the above-identified patent and that said Letters Patent is hereby corrected as shown below:

Title page, Item [54] and Column 1, lines 1-3,
Change the title to read as follows:

-- IONIZING BAR AND METHOD OF ITS FABRICATION --.

Signed and Sealed this

Sixth Day of May, 2003

JAMES E. ROGAN
*Director of the United States Patent and Trademark Office*